United States Patent
Mitani

[19]

[11] Patent Number: 5,918,462
[45] Date of Patent: Jul. 6, 1999

[54] BRAKE BOOSTER DEVICE

[75] Inventor: Tateki Mitani, Tokyo, Japan

[73] Assignee: Mitsubishi Denki Kabushiki Kaisha, Tokyo, Japan

[21] Appl. No.: 08/974,381

[22] Filed: Nov. 19, 1997

[30] Foreign Application Priority Data

May 12, 1997 [JP] Japan .................................. 9-120944

[51] Int. Cl.⁶ ................................................... F16D 31/02
[52] U.S. Cl. ....................................... 60/397; 123/339.14
[58] Field of Search .............................. 60/397; 123/350, 123/339.14; 477/183, 203

[56] References Cited

U.S. PATENT DOCUMENTS

| 4,024,709 | 5/1977 | Erdmann | 60/397 |
| 4,224,791 | 9/1980 | Ostwald | 60/397 |
| 4,633,757 | 1/1987 | Kubota | 91/367 |

OTHER PUBLICATIONS

"Automobile Engineering" (Jidosha–Kogaku) May 1996.

Primary Examiner—F. Daniel Lopez
Attorney, Agent, or Firm—Sughrue, Mion, Zinn, Macpeak & Seas, PLLC

[57] ABSTRACT

A brake booster having a body in which a booster pressure sensor for detecting the internal pressure of an atmospheric pressure chamber is provided, and in which the operating state of a brake pedal is detected by a pedal sensor. Further, when the brake pedal is not depressed, the internal pressure of the negative pressure chamber is detected by the booster pressure sensor. In contrast, when the brake pedal is depressed, an atmospheric pressure is detected by the same booster pressure sensor. Namely, when the brake pedal is not depressed, the negative pressure chamber and the atmospheric pressure chamber communicate with each other and are thus shut off from atmospheric air. Therefore, the internal pressure of the negative pressure chamber is detected by the booster pressure sensor which communicates with the atmospheric pressure chamber. Moreover, when the brake pedal is depressed, the atmospheric pressure chamber communicates with atmospheric air. Consequently, an atmospheric pressure is detected by the booster pressure sensor.

5 Claims, 5 Drawing Sheets

BRAKE BOOSTER DEVICE

BACKGROUND OF THE INVENTION

1. Field of the Invention

This invention relates to a brake booster device which is provided in a brake system of, for example, an automobile and which is operated to increase an operating force (or control force) applied from a brake pedal, and transmit the increased operating force to a master cylinder.

2. Description of the Related Art

FIG. 5 is a diagram schematically illustrating the construction of an example of a conventional speed density type control system for an automotive internal combustion gasoline engine. As shown in this figure, an injector 2 for injecting fuel, and an ignition coil 3 for generating sparks are attached to an engine body 1. Moreover, an intake (or inlet) manifold 4 is connected to the engine body 1. Further, part of the gas flowing from the engine body 1 toward the intake manifold 4 is fed back to the intake manifold 4 through a recirculation pipe 5. An exhaust gas recirculation (EGR) valve 6 is provided at a midpoint on the recirculation pipe 5.

A throttle valve 8, which is opened and closed mainly by operating an accelerator pedal (not shown), is provided in an air suction pipe 7 for introducing air from an air cleaner into the intake manifold 4. Further, a bypass pipe 9 for connecting upstream and downstream portions of the air suction pipe 7, which are upstream and downstream to the throttle valve 8 respectively, with each other is attached to the air suction pipe 7. Moreover, a bypass air valve 10 is provided in the bypass pipe 9. The injector 2, the ignition coil 3, the throttle valve 8 and the bypass air valve 10 are controlled by a control section (namely, a computer) 11.

A brake booster body 14 for increasing operating force applied from the brake pedal 12 and transmitting the increased operating force to the master cylinder 13 of a brake unit is connected with the intake manifold 4. A negative-pressure (or vacuum) chamber 14a which is communicated with the intake manifold 4 through a negative-pressure suction pipe 15, and an atmospheric pressure chamber 14b into which atmospheric air is introduced when pressing the brake pedal 12, are provided in the brake booster body 14.

Furthermore, a booster pressure sensor 16 which is operative to detect a pressure in the negative-pressure chamber 14a and to output a signal representing the detected pressure to the control section 11, is connected with the brake booster body 14. A manifold pressure sensor 17 which is operative to detect a pressure in the manifold 4 and to output a signal representing the detected pressure to the control section 11, is provided in the manifold 4. The amount of fuel injected from the injector 2 is calculated by the control section 11 according to a signal output from the manifold pressure sensor 17. Further, an atmospheric pressure sensor 18 for detecting atmospheric pressure is provided in the control section 11.

FIG. 6 is a partially sectional diagram showing the construction of the brake booster body 14 in FIG. 5. Similar construction of a brake booster is illustrated in, for example, the May 1996 issue of "Automobile Engineering" (Jidosha-Kogaku). As shown in FIG. 6, a power piston 22 capable of moving in lateral directions (as viewed in this figure) is enclosed in a booster casing (or case) 21. A diaphragm 23 is securely fixed onto the power piston 22. Circumferential edge portions of the diaphragm 23 are fixed to the booster casing 21. Thus, the inner space of the booster casing 21 is partitioned into the negative pressure chamber 14a and the atmospheric pressure chamber 14b.

A poppet valve assembly 24 is attached to the central portion of the power piston 22. The poppet valve assembly 24 is operated by the brake pedal 12 through a valve operating rod 25. Namely, when the brake pedal 12 is not depressed, the negative pressure chamber 14a and the atmospheric pressure chamber 14b are communicated with each other and are shut off from the outside. Further, when depressing the brake pedal 12, the atmospheric pressure chamber 14b is shut off from the negative pressure chamber 14a, while at the same time air is introduced into the atmospheric pressure chamber 14b.

The movement of the power piston 22 is transmitted to the master cylinder 13 through a push rod 26. The power piston 22 is pushed by a diaphragm return spring 27, which is disposed in the negative pressure chamber 14a, toward the atmospheric pressure chamber 14b.

Next, the operation will be described. When the brake pedal 12 is not depressed, the negative pressure chamber 14a and the atmospheric pressure chamber 14b are communicated with each other and are shut off from the outside by the poppet valve assembly 24. Therefore, a pressure Pa in the negative pressure chamber 14a is equal to a pressure Pb in the atmospheric pressure chamber 14b (namely, Pa=Pb=a negative pressure).

In contrast, when depressing the brake pedal 12, the atmospheric pressure chamber 14b is shut off from the negative pressure chamber 14a and air is introduced into the atmospheric pressure chamber 14b. Consequently, Pa<Pb= atmospheric pressure. Thus, a differential pressure between the internal pressure of the negative pressure chamber 14a and that of the atmospheric pressure chamber 14b is generated. Furthermore, the power piston 22 is moved toward the negative pressure chamber 14a against the force of the diaphragm return spring 27 by the differential pressure. Thus, the pushing force of the power piston 22 is transmitted to the master cylinder 13 through the push rod 26.

The pushing force of the push rod 26 due to the differential pressure is obtained by multiplying the differential pressure (Pb−Pa) by the area of the diaphragm 23. Thus, when depressing the brake pedal 12, the force obtained by adding the pushing force caused by the differential pressure to the brake pedal depressing force is transmitted to the master cylinder 13.

Thus, in the case of this conventional brake booster device, the operating force to be exerted on the master cylinder 13 is increased by utilizing the differential force between the (internal) negative pressure of the negative pressure chamber 14a and the atmospheric pressure. Consequently, there is the necessity of securing the aforementioned differential pressure at all times. Therefore, the internal pressure of the negative pressure chamber 14a is detected by the booster pressure sensor 16. In addition, the atmospheric pressure is detected by the atmospheric pressure sensor 18, and the differential pressure is monitored by the control section 11. Further, in the case that the differential pressure is insufficient, the throttle valve 8 or the air bypass valve 10 is closed. Thus, the internal pressure of the negative pressure chamber 14a communicated with the intake manifold 4 is reduced to thereby regulate the differential pressure.

In the case of the conventional brake booster device constructed as described above, since the internal pressure of the negative pressure chamber 14a is detected by the booster pressure sensor 16 which is communicated with the negative pressure chamber 14a, there is a need to provide the atmospheric pressure sensor 18 in the control section 11 to detect the differential pressure between the internal pressure of the negative pressure chamber 14a and the atmospheric pressure. This results in an increased manufacturing cost of the device. Moreover, there are variations among individual booster pressure sensors 16 and atmospheric pressure sensors 18. Consequently, measurement errors are increased.

This invention is provided to solve the aforementioned problems of the conventional device.

SUMMARY OF THE INVENTION

Accordingly, an object of the present invention is to obtain a brake booster device which does not have a sensor dedicated to the detection of atmospheric pressure and that can be constructed at a low cost.

To this end, according to one aspect of the present invention, there is provide a brake booster device comprising: a brake booster body including; a booster casing, a power piston reciprocatively provided in the booster casing, a diaphragm provided between the power piston and the booster casing for partitioning the booster casing into a negative pressure chamber and an atmospheric pressure chamber, a poppet valve assembly for causing a change between a state in which the negative pressure chamber and the atmospheric pressure chamber are communicated with each other and the atmospheric pressure chamber is shut from atmospheric air, and a state in which the atmospheric pressure chamber is shut from the negative pressure chamber and the atmospheric pressure chamber is communicated with atmospheric air, by being operated by a brake pedal, a push rod for transmitting a movement of the power piston to a master cylinder of a brake unit, and a return spring for pushing the power piston toward the atmospheric pressure chamber; negative pressure generating means communicated with the negative pressure chamber for causing the negative pressure chamber to have a negative internal pressure; negative pressure regulating means for regulating the internal pressure of the negative pressure chamber; a booster pressure sensor for detecting an internal pressure of the atmospheric pressure chamber; a pedal sensor for detecting an operating state of the brake pedal; and a control section for measuring a differential pressure between the internal pressure of the negative pressure chamber and an atmospheric pressure according to a signal sent from the booster pressure sensor and a signal sent from the pedal sensor, and for controlling the negative pressure regulating means according to the differential pressure.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

The embodiments according to the present invention will now be described with reference to the accompanying drawings.

First Embodiment

Figure 1:
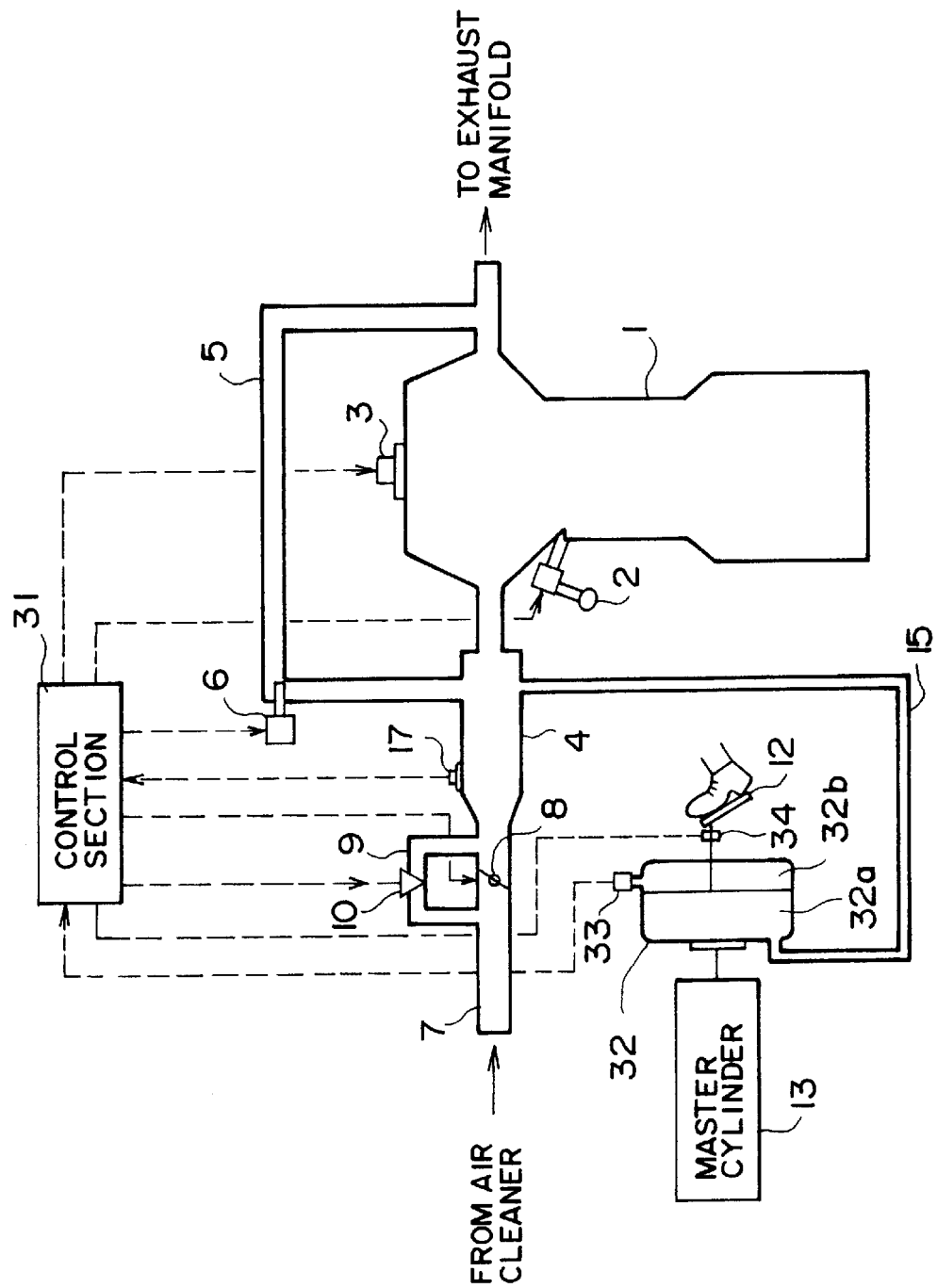
FIG. 1 is a schematic diagram showing the construction of a control system of an automotive internal combustion gasoline engine provided with a brake booster device according to a first embodiment of this invention.

FIG. 1 is a schematic diagram showing the construction of a control system of an automotive internal combustion gasoline engine, which is provided with a brake booster device according to a first embodiment of the present invention. In the figure, an injector 2 for injecting fuel, and an ignition coil 3 for generating a spark are attached to an engine body 1. Moreover, an intake manifold 4 acting as negative pressure generating means is connected to the engine body 1. Further, part of the gas flowing from the engine body 1 toward the intake manifold 4 is fed back to the intake manifold 4 through a recirculation pipe 5. An EGR valve 6 is provided at a midpoint on the recirculation pipe 5.

A throttle valve 8, which acts as a negative pressure regulating means and is opened and closed mainly by operating an accelerator pedal (not shown) is provided in an air suction pipe 7 which introduces air from an air cleaner into the intake manifold 4. Further, a bypass pipe 9 for connecting upstream and downstream portions of the air suction pipe 7, which are upstream and downstream to the throttle valve 8 respectively, with each other is attached to the air suction pipe 7. Moreover, an air bypass valve 10 acting as a negative pressure regulating means is provided in the bypass pipe 9. The injector 2, the ignition coil 3, the throttle valve 8 and the air bypass valve 10 are all controlled by a control section (namely, a computer) 31.

A brake booster body 32 for increasing the operating force applied from the brake pedal 12 and transmitting the increased operating force to the master cylinder 13 of the brake unit is connected with the intake manifold 4. A negative-pressure chamber 32a which is communicated with the intake manifold 4 through a negative-pressure suction pipe 15, and an atmospheric pressure chamber 32b into which atmospheric air is introduced when pressing the brake pedal 12, are provided in the brake booster body 14.

Further, a booster pressure sensor 33 which is operative to detect a pressure in the atmospheric pressure chamber 32b and to output a signal representing the detected pressure to the control section 31, is connected with the brake booster body 32. A manifold pressure sensor 17 which is operative to detect a pressure in the intake manifold 4 and to output a signal representing the detected pressure to the control section 31, is provided in the manifold 4. The amount of fuel injected by the injector 2 is calculated by the control section 31 according to a signal output from the manifold pressure sensor 17. Further, a pedal sensor 34 for detecting that the brake pedal 12 is depressed a predetermined amount or more and outputting a signal, which indicates such a fact, to the control section 31, is mounted on the brake pedal 12.

Figure 2:
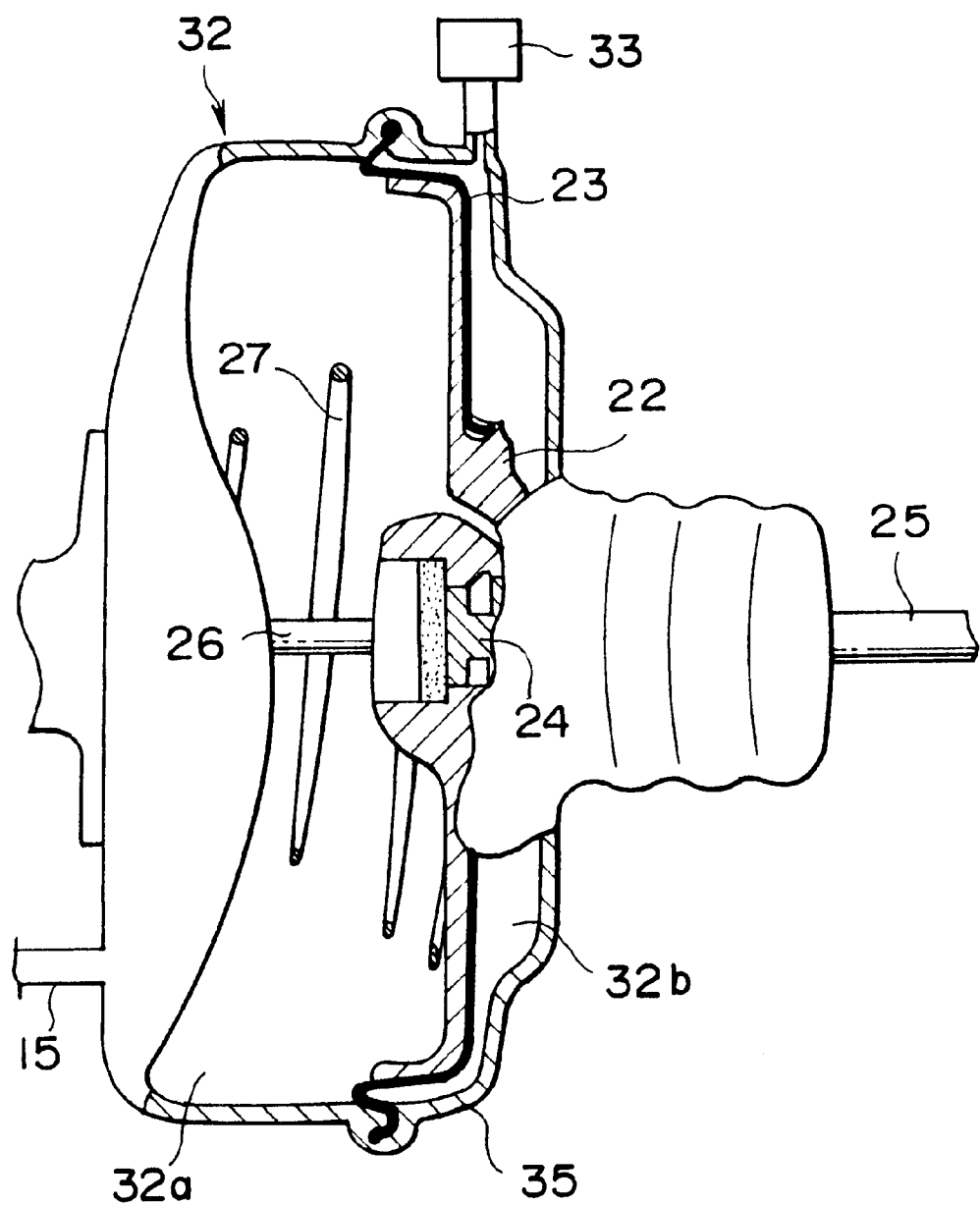
FIG. 2 is a partially sectional diagram showing the construction of a brake booster body in FIG. 1.

FIG. 2 is a partially sectional diagram showing the construction of the brake booster body 32 in FIG. 1. As shown in FIG. 2, a power piston 22 being capable of moving in lateral directions (as viewed in the figure) is housed in a booster casing 35. A diaphragm 23 is rigidly secured to the power piston 22. Circumferential edge portions of the diaphragm 23 are secured to the booster casing 35. Thus, the inner space of the booster casing 35 is partitioned into the negative pressure chamber 32a and the atmospheric pressure chamber 32b.

A poppet valve assembly 24 is attached to the central portion of the power piston 22. The poppet valve assembly 24 is operated by the brake pedal 12 through a valve operating rod 25. Namely, when the brake pedal 12 is not depressed, the negative pressure chamber 32a and the atmospheric pressure chamber 32b are communicated with each other and are shut off from the air. Further, when depressing the brake pedal 12, the atmospheric pressure chamber 32b is shut off from the negative pressure chamber 32a and the air is introduced into the atmospheric pressure chamber 32b.

The movement of the power piston 22 is transmitted to the master cylinder 13 through a push rod 26. The power piston 22 is pushed by a diaphragm return spring 27, which is disposed in the negative pressure chamber 32a, toward the atmospheric pressure chamber 32b.

Next, the operation will be described. When the brake pedal 12 is not depressed, the negative pressure chamber 32a and the atmospheric pressure chamber 32b are communicated with each other and are shut off from the air by the poppet valve assembly 24. Therefore, the pressure Pa in the negative pressure chamber 32a is equal to the pressure Pb in the atmospheric pressure chamber 32b (namely, Pa=Pb=a negative pressure).

In contrast, when depressing the brake pedal 12, the atmospheric pressure chamber 32b is shut off from the negative pressure chamber 32a and air is introduced into the atmospheric pressure chamber 32b. Consequently, Pa<Pb= the atmospheric pressure. Thus, a differential pressure is produced between the internal pressure of the negative pressure chamber 32a and that of the atmospheric pressure chamber 32b. Furthermore, the power piston 22 is moved toward the negative pressure chamber 32a against the force of the diaphragm return spring 27 by this differential pressure. Thus, the pushing force of the power piston 22 is transmitted to the master cylinder 13 through the push rod 26.

The pushing force of the push rod 26 due to the differential pressure is obtained by multiplying the differential pressure (Pb−Pa) by the area of the diaphragm 23. Therefore, when depressing the brake pedal 12, the force obtained by adding the pushing force caused by the differential pressure to brake pedal depressing force is transmitted to the master cylinder 13.

As described above, in the brake booster device, the operating force to be exerted on the master cylinder 13 is increased by utilizing the differential force between the internal negative pressure of the negative pressure chamber 32a and the atmospheric pressure. Consequently, there is the necessity of securing the aforementioned differential pressure at all times. Therefore, the internal pressure of the negative pressure chamber 32a and the atmospheric pressure are detected by the booster pressure sensor 33. In addition, the differential pressure therebetween is monitored by the control section 31. Further, in the case that the differential pressure is insufficient, the throttle valve 8 or the bypass air valve 10 is closed. Thus, the internal pressure of the negative pressure chamber 32a communicated with the intake manifold 4 is reduced to thereby regulate the differential pressure.

More specifically, when the brake pedal 12 is not depressed, the internal pressure of the negative pressure chamber 32a is detected by the booster pressure sensor 33. In contrast, when the brake pedal 12 is depressed, the atmospheric pressure is detected by the same booster pressure sensor 33. Namely, when the brake pedal 12 is not depressed, the negative pressure chamber 32a and the atmospheric pressure chamber 32b are communicated with each other and shut off from the air. Thus, the internal pressure of the negative pressure chamber 32a is detected by the booster pressure sensor 33, which is communicated with the atmospheric pressure chamber 32b. Further, when the brake pedal 12 is depressed the atmospheric pressure chamber 32b is communicated with the air so that the air pressure is detected by the booster pressure sensor 33.

The pedal sensor 34 detects whether or not the brake pedal 12 is depressed. A sensor (not shown), which has already been provided in the device for another purpose may be also used as the pedal sensor 34. The control section 31 has a memory (not shown) for storing data representing the detected atmospheric pressure. When the brake pedal 12 is depressed a predetermined amount or more a signal representing the atmospheric pressure, which is sent from the booster pressure sensor 33, is stored in this memory. Data representing the atmospheric pressure stored in the memory is updated every time the brake pedal 12 is depressed. When the brake pedal 12 is not depressed, a signal output from the booster pressure sensor 33 representing the internal pressure of the negative pressure chamber 32a is compared with a signal representing the latest atmospheric pressure. Thus, the differential pressure is obtained.

Figure 3:
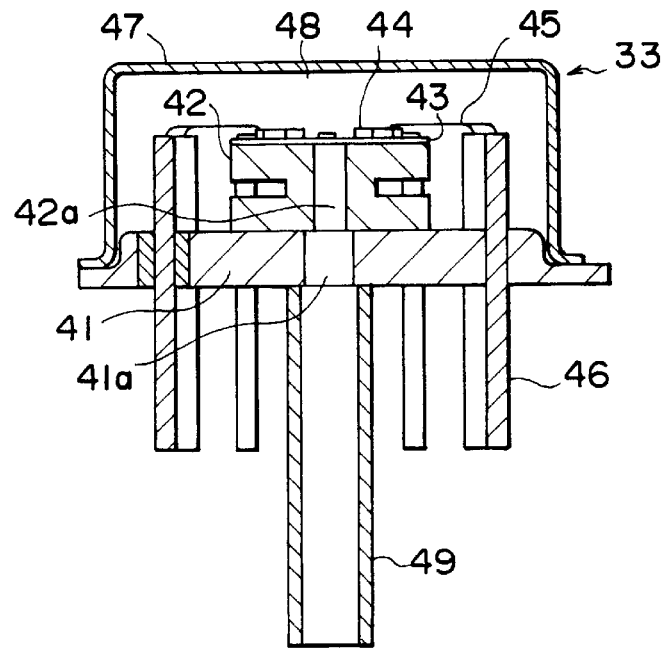
FIG. 3 is a sectional diagram showing a sensor device of a booster pressure sensor in FIG. 1.

FIG. 3 shows a sectional view of a sensor device used in the booster pressure sensor 33 in FIG. 1. In this example, a sensor element (or device) of the absolute pressure type (namely, an absolute pressure sensor element), which employs an absolute vacuum as a reference, is used. A silicon substrate 42 is mounted on a header 41. Through holes 41a and 42a are communicated with each other and are bored in the header 41 and the silicone substrate 42, respectively. An IC chip 43 is mounted on the silicon substrate 42 and is provided with a diaphragm 44 for covering the through hole 42a. A gauge resistor (not shown) is provided on the diaphragm 44.

Circuits provided on IC chip 43 are connected with a plurality of terminals 46 through a plurality of gold wires 45. A cap 47 is fixed on the header 41. In the cap 47, an absolute vacuum space 48 is formed. The internal pressure of the atmospheric pressure chamber 32b in FIG. 1 is introduced into the through holes 41a and 42a by way of a nipple 49 securely attached to the header 41.

In such a sensor element, 49 the diaphragm 44 is warped or distorted by the differential pressure between the absolute vacuum of the absolute vacuum space 48 and the pressure introduced to the through holes 41a and 42a through the nipple. The resistance of the gauge resistor varies with the warpage of the diaphragm 44. Such a variation in resistance is converted into an electric signal which is output to the control section 31 through the gold wire 45 and the terminals 46. In the control section 31, a pressure is obtained according to the signal sent from the sensor element.

In the case of the brake booster device of the present invention constructed as described above, the internal negative pressure of the negative pressure chamber 32a and the atmospheric pressure are detected by the booster pressure sensor 33 which is communicated with the atmospheric pressure chamber 32b. Therefore, this brake booster device does not need to be provided with a pressure sensor for detecting the atmospheric pressure in addition to the pressure sensor 33, thereby reducing costs. Moreover, since the brake pedal 12 cannot remain unpressed for long periods of time while driving an automobile, this brake booster device can sufficiently respond to changes in atmospheric pressure.

Moreover, atmospheric sensors used to control devices other than the automotive internal combustion engine can be omitted. For instance, the booster pressure sensor 33 of the first embodiment of the present invention may be used as an atmospheric pressure sensor for measuring, transmission oil pressure (or hydraulic), engine oil pressure, brake oil pressure and driving-system oil pressure.

Moreover, in the case of the aforementioned embodiment of the present invention, the present invention is applied to an internal-combustion-engine control system. The present invention, however, can be applied to a system provided with a Karman vortex air flow sensor, which detects (an amount of) intake air flow from the air cleaner by utilizing the Karman vortex principle, and to a system provided with a hot wire type air flow sensor (or a heating resistor type air flow sensor), which detects intake air flow from the air cleaner by using a heat source (or reservoir). Additionally, if an absolute pressure type sensor element is used, the atmospheric pressure sensor can be omitted or saved.

Second Embodiment

Figure 4:
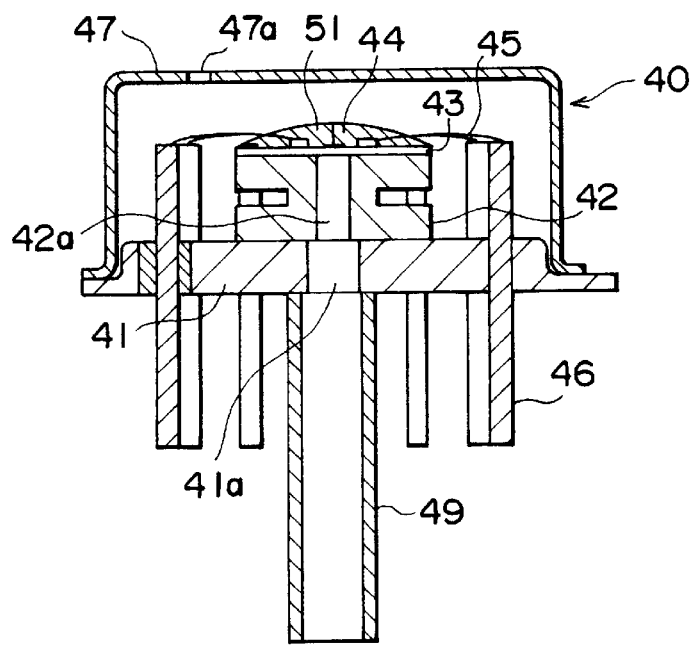
FIG. 4 is a sectional diagram showing a primary part of a booster pressure sensor of a brake booster device according to a second embodiment of this invention.
Figure 5:
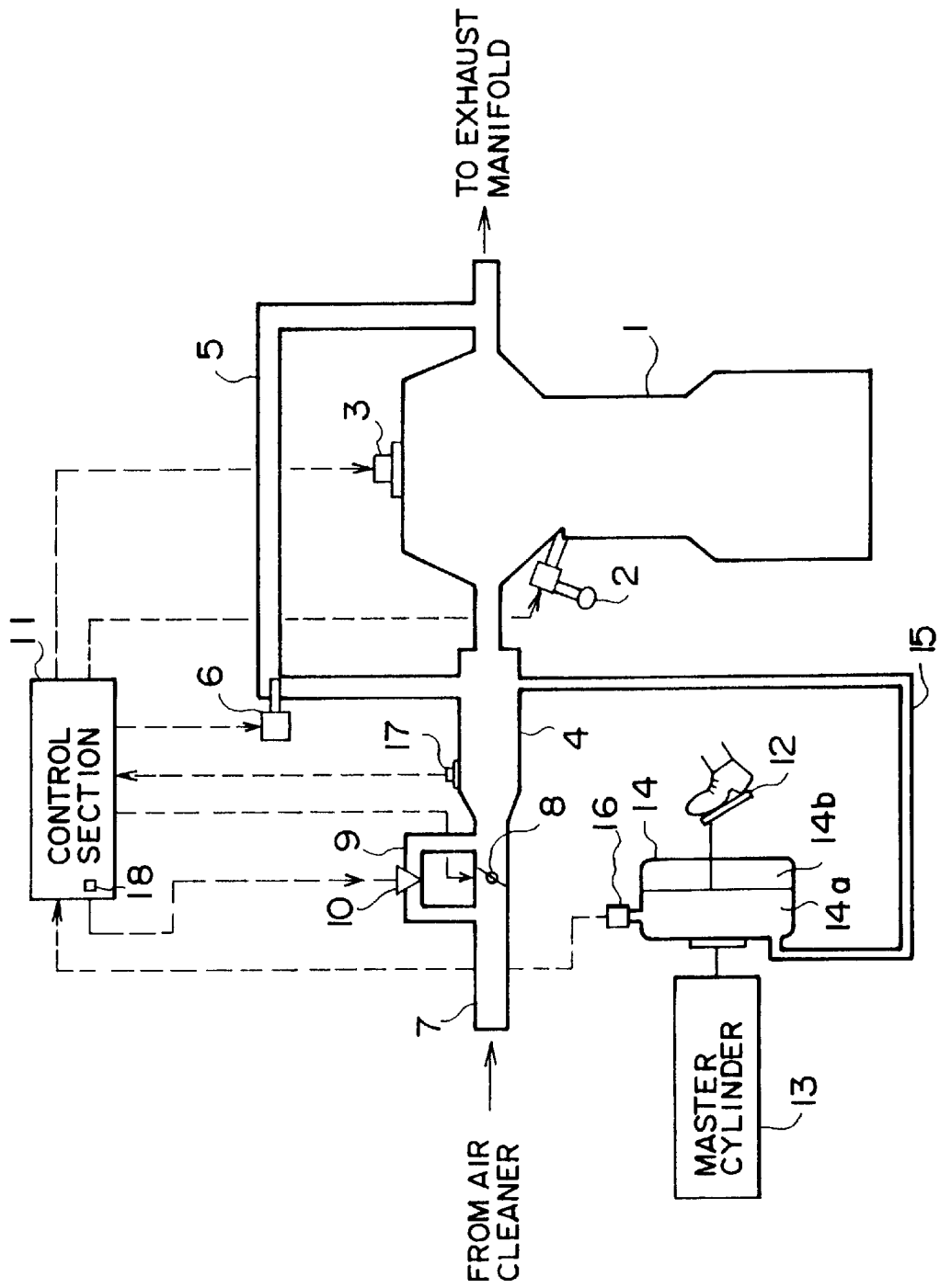
FIG. 5 is a diagram schematically illustrating the construction of an example of a conventional speed density type control system for an automotive internal combustion gasoline engine.
Figure 6:
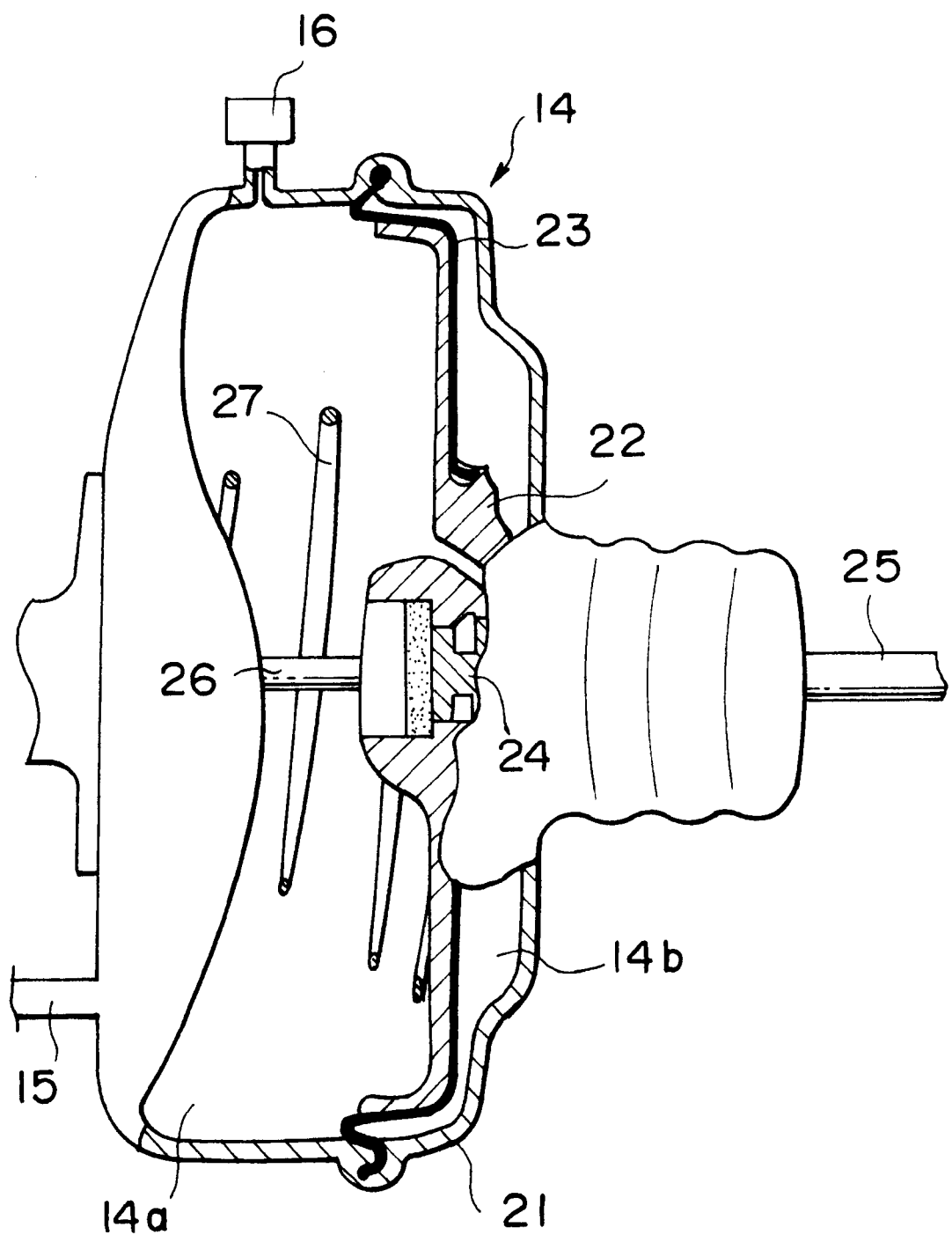
FIG. 6 is a partially sectional diagram showing the construction of the brake booster body in FIG. 5.

Next, a second embodiment of the invention will be described. In the second embodiment, a booster pressure sensor 40 which has a gauge pressure type sensor element as illustrated in FIG. 4 is used. The sensor element in FIG. 4 employs the atmospheric pressure as a reference, and has a silicon gel 51 provided on both the IC chip 43 and the diaphragm 44. Further, a vent hole 47a is bored in the cap 47. The internal pressure of the cap 47 equalized with the atmospheric pressure. Thus, the differential pressure between the internal pressure of the atmospheric pressure chamber 32a and the atmospheric pressure is detected by utilizing the gauge resistor provided on the diaphragm 44. The other constructions are the same as in the first embodiment.

In the case of a brake booster device using such a gauge pressure type sensor element, when the brake pedal 12 is not depressed the differential pressure between the internal pressure of the negative pressure chamber 32a and the atmospheric pressure is detected by the booster pressure sensor 33. The throttle valve 8 or the bypass valve 10 is controlled by the control section 31 according to the detected differential pressure.

Further, when the brake pedal 12 is depressed the internal pressure of the atmospheric pressure chamber 32b is equal to the atmospheric pressure. Thus, pressures exerted on both sides respectively, of the diaphragm 44 in FIG. 4 are equal to each other. Therefore, such a sensor cannot be used as an atmospheric pressure sensor. However, an output of this sensor at this time is utilized for correcting a detection value thereof when the brake pedal 12 is not depressed.

Namely, although the detection characteristics of the booster pressure sensor 40 change with time owing to the deterioration of the sensor element, such a change in the detection characteristics is monitored and the detection value is corrected by preliminarily storing a reference numerical value in the control section 31 and then comparing an output value, which is output from the booster pressure sensor 40, with the stored reference numerical value. Therefore, initial tolerance can be set at a large value. Consequently, the manufacturing cost of the device can be reduced.

Incidentally, in the case of the aforementioned embodiments of the present invention, the intake manifold 4 is utilized as the negative pressure generating means. However, the negative pressure generating means is not limited thereto. For example, in the case of a diesel engine, a vacuum pump maybe used as the negative pressure generating means.

Moreover, although in the foregoing description of the embodiments of the present invention, brake booster devices for use in braking units of automobiles were described, the present invention, can also be applied to brake booster devices for use in braking units of other vehicles or apparatus.

Although the preferred embodiments of the present invention have been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. A brake booster device comprising:
    a brake booster body including;
        a booster casing,
        a power piston reciprocatively provided in said booster casing,
        a diaphragm provided between said power piston and said booster casing for partitioning said booster casing into a negative pressure chamber and an atmospheric pressure chamber,
        a poppet valve assembly for causing a change between a state in which said negative pressure chamber and said atmospheric pressure chamber are communicated with each other and said atmospheric pressure chamber is shut from atmospheric air, and a state in which said atmospheric pressure chamber is shut from said negative pressure chamber and the atmospheric pressure chamber is communicated with atmospheric air, by being operated by a brake pedal,
        a push rod for transmitting a movement of said power piston to a master cylinder of a brake unit, and
        a return spring for pushing said power piston toward said atmospheric pressure chamber;
    negative pressure generating means communicated with said negative pressure chamber for causing said negative pressure chamber to have a negative internal pressure;
    negative pressure regulating means for regulating the internal pressure of said negative pressure chamber;
    a booster pressure sensor for detecting an internal pressure of said atmospheric pressure chamber;
    a pedal sensor for detecting an operating state of said brake pedal; and
    a control section for calculating a differential pressure between the internal pressure of said negative pressure chamber and an atmospheric pressure according to a signal sent from said booster pressure sensor and a signal sent from said pedal sensor, and for controlling said negative pressure regulating means according to the differential pressure.

2. The brake booster device according to claim 1, wherein said booster pressure sensor has an absolute pressure type sensor element which employs an absolute vacuum as a reference, and wherein said control section measures the internal pressure of said negative pressure chamber from a signal output by said booster pressure sensor when said atmospheric pressure chamber is shut from atmospheric air, and for measuring an atmospheric pressure from a signal output from said booster pressure sensor when said atmospheric pressure chamber is communicated with atmospheric air.

3. The brake booster device according to claim 1, wherein said booster pressure sensor has a gauge pressure type sensor element which employs an atmospheric pressure as a reference.

4. The brake booster device according to claim 3, wherein said control section corrects a detection value which is output from said booster pressure sensor when said atmospheric pressure chamber is shut from atmospheric air according to a detection value output from said booster pressure sensor when said atmospheric pressure chamber communicates with atmospheric air.

5. The brake booster device according to claim 1, wherein said negative pressure generating means is an intake manifold through which air to be supplied to an internal combustion gasoline engine passes, and wherein said negative pressure regulating means is a valve which is provided upstream of said intake manifold and is operated to regulate an air flow amount introduced into said intake manifold.

* * * * *